(12) United States Patent
Adame

(10) Patent No.: US 7,001,510 B1
(45) Date of Patent: Feb. 21, 2006

(54) SIPHON HOSE WITH GALLON COUNTER

(76) Inventor: Rene Adame, 4513 Columbine Dr., Austin, TX (US) 78727

( * ) Notice: Subject to any disclaimer, the term of this patent is extended or adjusted under 35 U.S.C. 154(b) by 0 days.

(21) Appl. No.: 10/985,276

(22) Filed: Nov. 10, 2004

(51) Int. Cl.
*A01K 63/04* (2006.01)
*G01F 1/28* (2006.01)
*F04F 10/00* (2006.01)

(52) U.S. Cl. ............... 210/169; 210/232; 210/416.2; 137/140; 73/861.75

(58) Field of Classification Search ............... 210/169, 210/232, 416.1, 488, 416.2, 489; 119/259; 137/140, 40; 73/861.75
See application file for complete search history.

(56) References Cited

U.S. PATENT DOCUMENTS

| | | | |
|---|---|---|---|
| 3,919,455 A | 11/1975 | Sigdell | |
| 4,589,280 A | 5/1986 | Carter | |
| 4,615,798 A * | 10/1986 | O'Dougherty | 210/169 |
| 4,683,748 A | 8/1987 | Carter | |
| 4,934,187 A * | 6/1990 | Woltman | 73/198 |
| D317,970 S | 7/1991 | Yen | |
| 5,240,596 A * | 8/1993 | Chesnut | 210/136 |
| 5,263,370 A | 11/1993 | Murata et al. | |
| 5,351,557 A | 10/1994 | Jones | |
| D409,716 S | 5/1999 | Bakke | |
| 6,878,267 B1 * | 4/2005 | Mandia | 210/169 |

FOREIGN PATENT DOCUMENTS

DE 29710584 * 6/1997

* cited by examiner

*Primary Examiner*—Fred G. Prince
(74) *Attorney, Agent, or Firm*—Lawrence J. Gibney, Jr.

(57) ABSTRACT

A siphon to be used when removing water from a personal aquarium for cleaning purposes. The water passes through propellers or flaps of a present friction, which monitor the volume flowing out of the aquarium. The amount of water is displayed on an exterior gauge so the user may achieve accuracy. Appropriate filtering media is provided to insure that small particles such as rocks and gravel do not injure the internal parts of the device.

3 Claims, 5 Drawing Sheets

SIPHON HOSE WITH GALLON COUNTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention is a siphon hose with a counter to monitor the volume of liquid having passed through the siphon when removing water from an aquarium and similar vessels.

B. Prior Art

Prior art exists which relates to both siphons and volumetric counters. Sigdell (U.S. Pat. No. 3,919,455) is a device, which siphons a liquid and measures the volumetric flow through the use of an electric sensor. Carter (U.S. Pat. No. 4,589,280) is a device to be used with medical equipment, which controls a specified volume of liquid in a vacuum before allowing the liquid to exit. Yen (Des. 317, 970) is simply a siphon to be used with aquariums. The prior art lacks a device that combines a siphon, simple flow meter, and a filter to prevent aquarium gravel from entering the siphon. The present invention provides these features.

BRIEF SUMMARY OF THE INVENTION

The present invention is a siphon to be used for the cleaning of a fish tank or aquarium. The present invention removes the water using a filter so as to not remove the gravel, which usually lines the floor of an aquarium. The present invention has a flow meter device, which shows the amount of water that has been removed from the aquarium. This allows the user to precisely remove desired amounts of water from their aquariums.

The removal of a certain amount of water is desirable to maintain the proper quality of the water.

DETAILED DESCRIPTION OF THE EMBODIMENTS

The present invention 10 offers a way to measure the volume of water taken out of a fish tank or aquarium when cleaning the tank. When a user changes the water in an aquarium, the usual amount of water to be removed is approximately 20–25% of the water in the tank. The present invention provides the user a mechanism to accurately remove this amount and retain the gravel located in the tank.

First Embodiment

Figure 1:
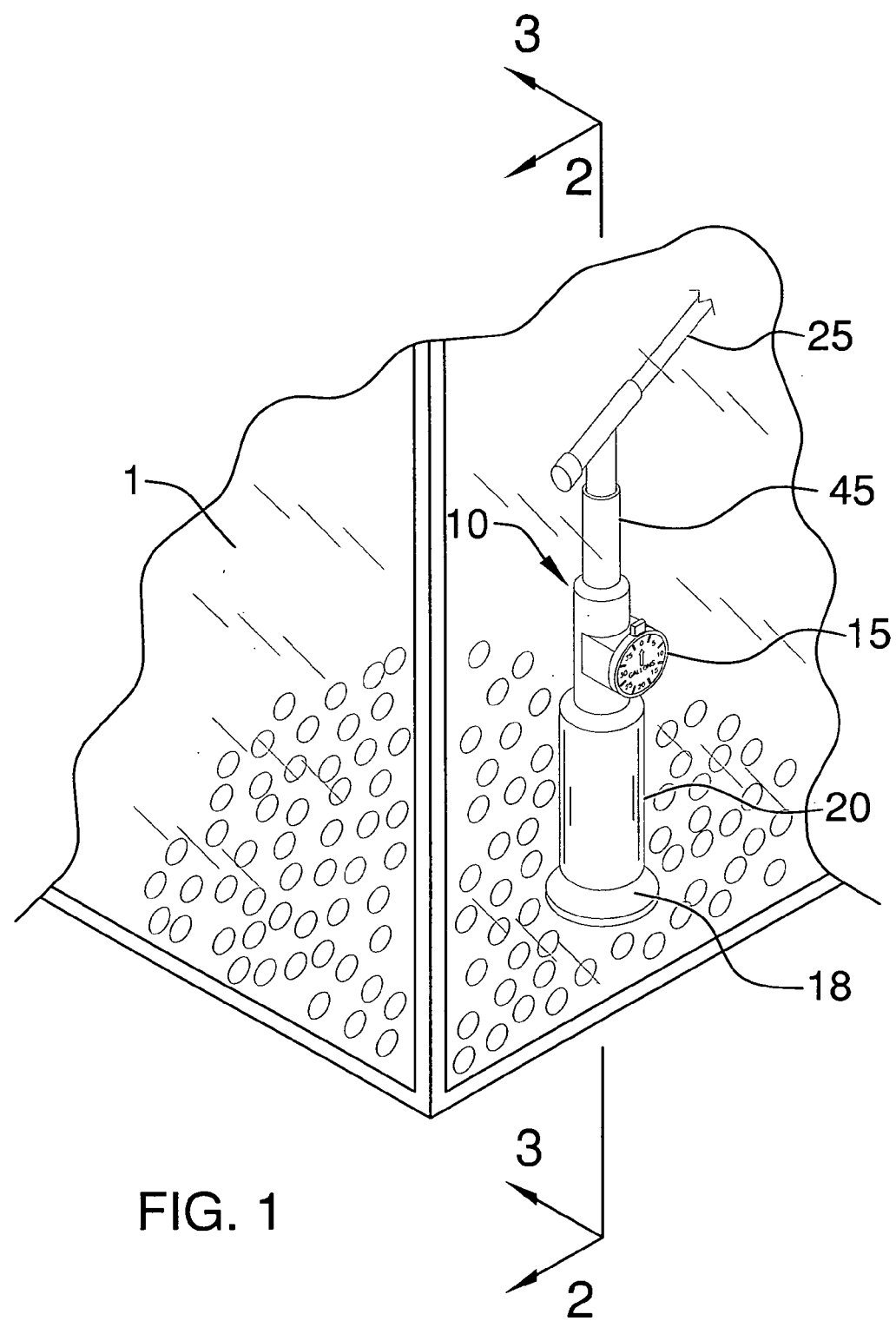
FIG. 1 is a perspective view of the device in use inside an aquarium.
Figure 2:
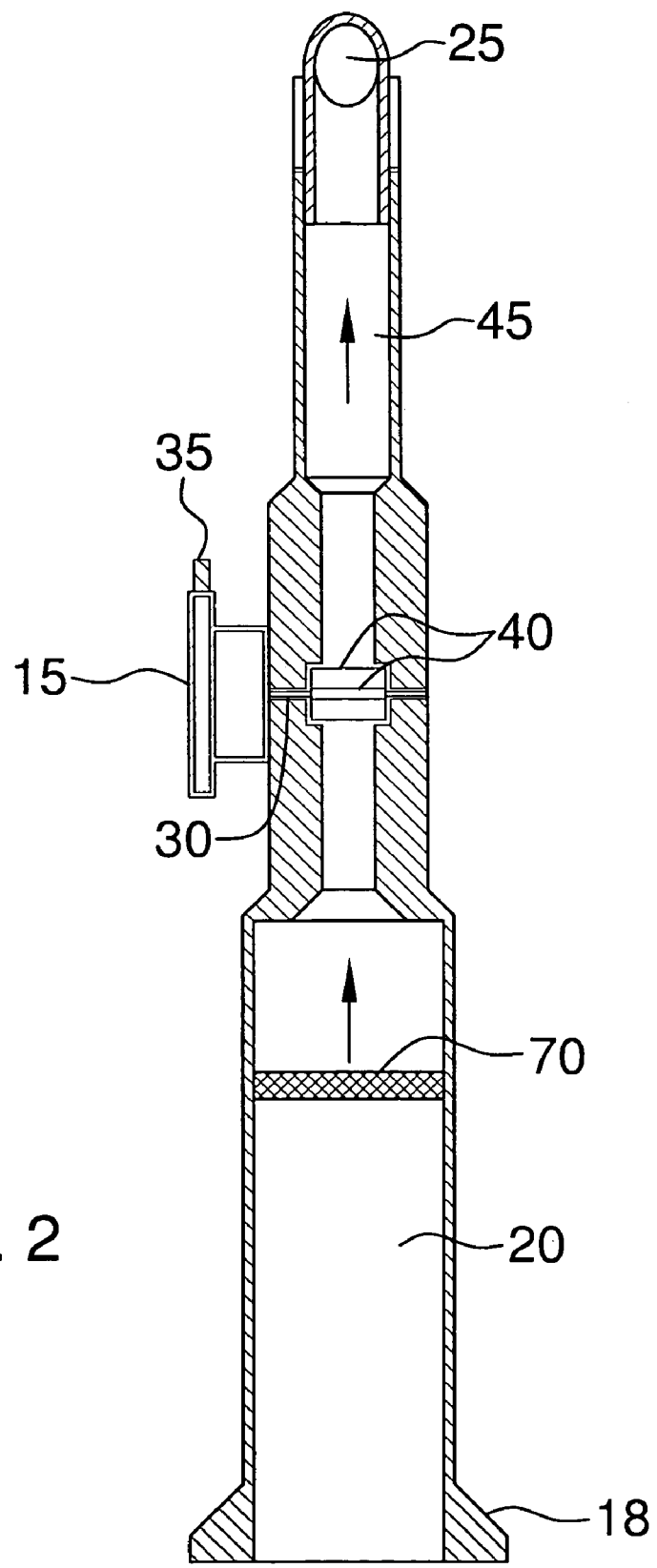
FIG. 2 is a cross sectional view of the device along line 2—2 from FIG. 1.
Figure 3:
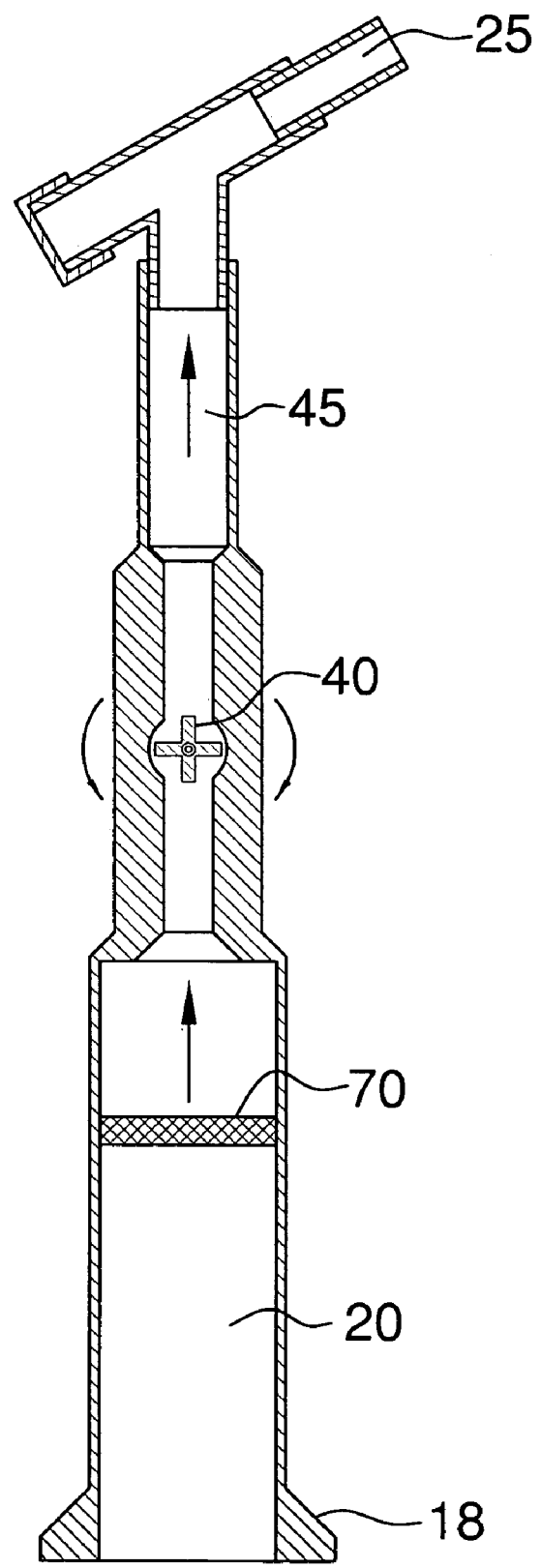
FIG. 3 is a cross sectional view of the device along line 3—3 from FIG. 1.

The present invention 10 has a long cylindrical shape. The base 18 of the invention is a wide circular shape with a closed end and tapered sides. The hollow center section 20 is connected to the top of the base. The water flows from the bottom of the tank as indicated by the directional arrow on FIGS. 2 and 3. The hollow section 20 will be a long cylindrical shape and is connected to a suction hose 45 inside the cylinder. A filter 70 is placed within the hollow section 20 to prevent the entry of gravel or other small particles through the meter. The water to be removed from the aquarium flows past the flaps 40, which rotate on fixed pins 30 and through the suction hose 45. The flaps 40 have a resistance set to rotate only when a certain amount of water has passed through them. The rotation of the flaps 40 is recorded and displayed on a gauge 15, which is located on the exterior of the invention.

The gauge 15 displays the volume removed probably in gallon units, although metric measurements may also be used and settings for the gauge may be different for aquariums of different volumes of water. The gauge 15 is equipped with a reset button 35, which the user will press after each use in order to maintain accurate volumetric removal and return the gauge to zero. After flowing though the flaps 40, the water continues into the suction hose 45 at the top of the siphon 25. The suction hose 45 provides an exit for the water removed by the device 10.

The device 10 is probably manufactured of a durable material such as plastic. The dimensions of the device 10 may vary depending on the speed of water removal desired.

Second Embodiment

Figure 4:
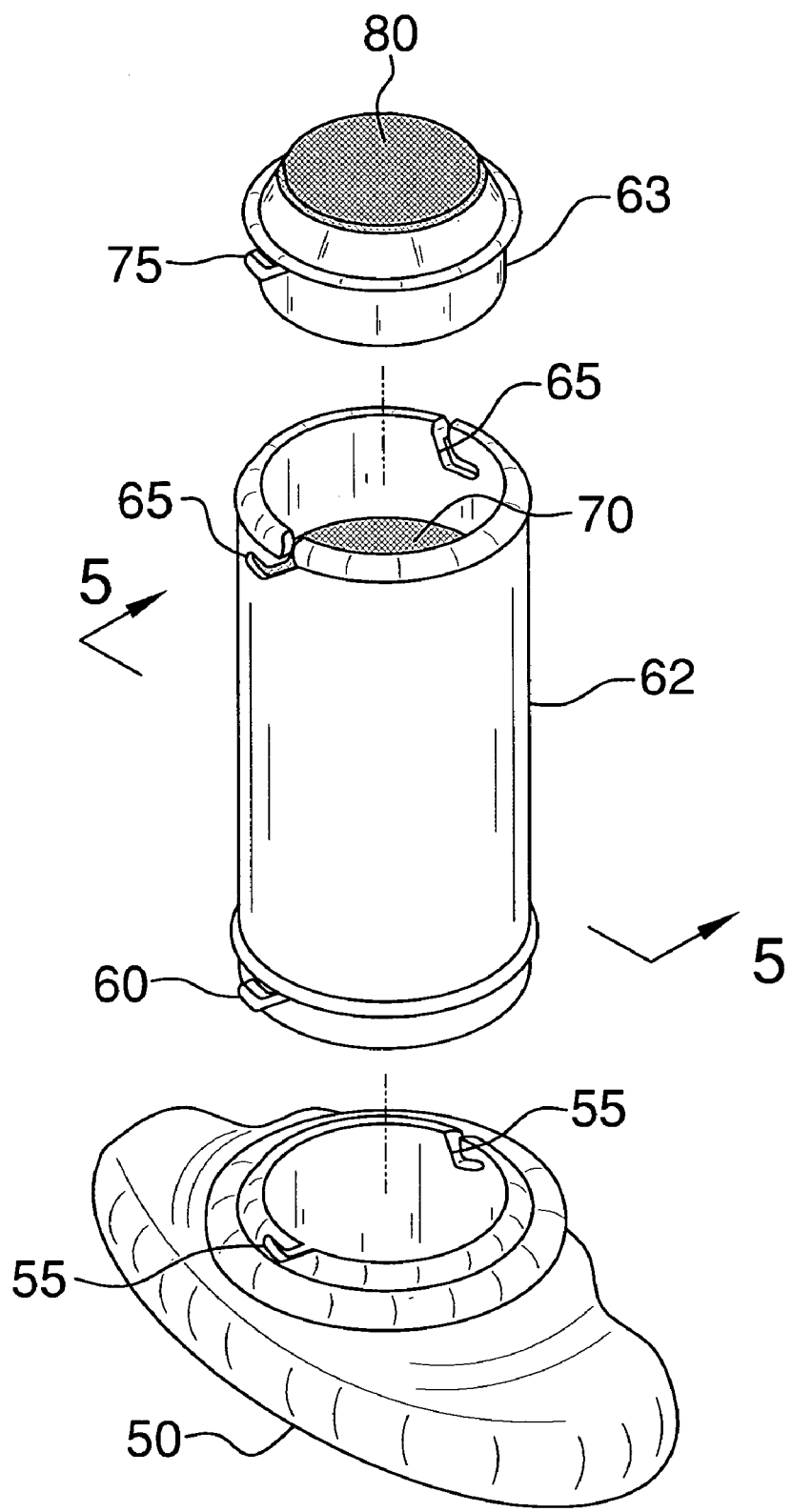
FIG. 4 is an exploded view of the bottom section of an alternative embodiment.
Figure 5:
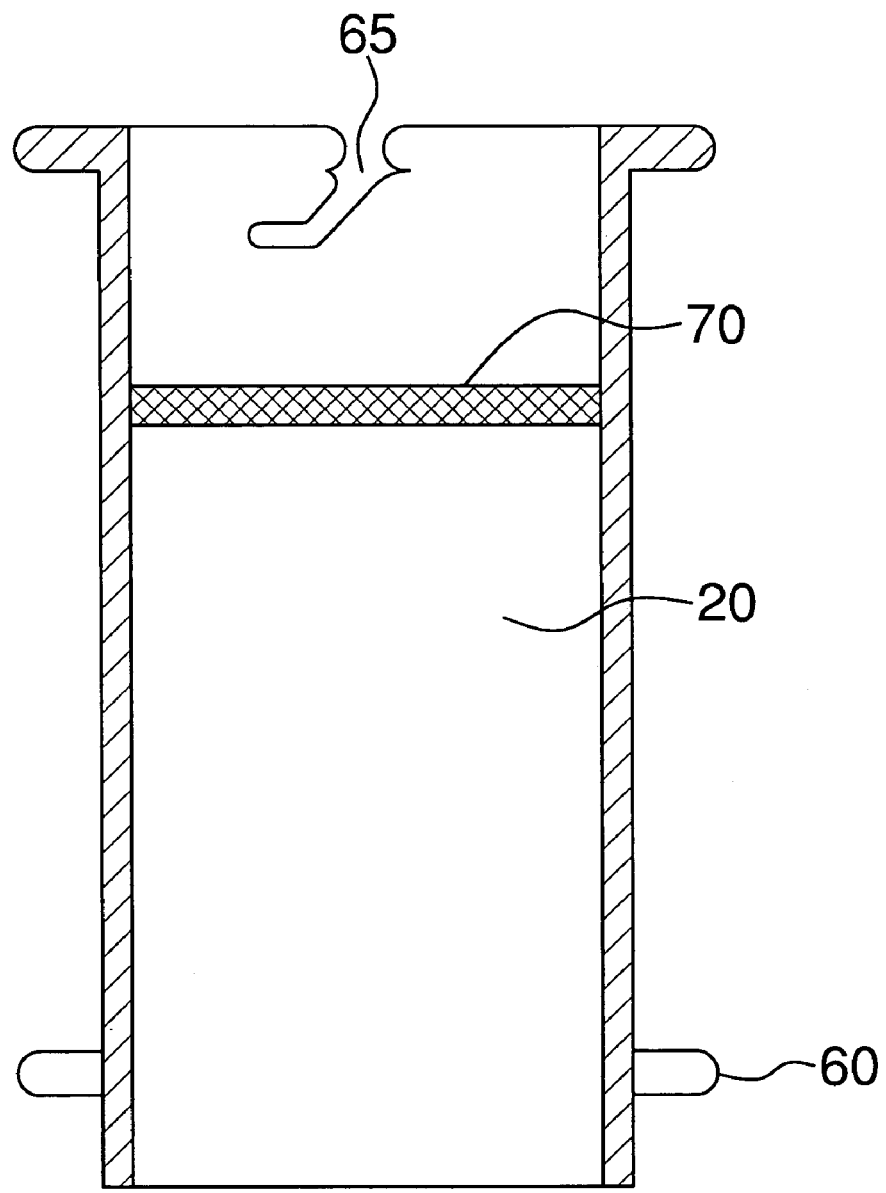
FIG. 5 is a view according to line 5—5 on FIG. 4 of the alternative embodiment.

In order to make the device as practical as possible and allow the individual to only need one device, FIGS. 4 and 5 represent an alternative embodiment of the base 50 of the invention. All other parts of the invention with respect to the measurement of gallons removed would remain the same.

According to FIG. 4 the hollow section 62 can be disconnected from the base 50 by notches 60, 75 and corresponding grooves 55, 65. This would allow the individual aquarium owner to buy multiple lengths of extensions to fit the depth of the aquarium as well as the suction device to a particular need. In some instances a wider base 50 may be needed. In some cases the wider base is not necessary. A filter 70 would be placed within the hollow section 62 to prevent damage to the interior of the device by rocks and gravel. Additionally an additional filter 80 would be installed to the top section 63 to insure that only water passes through the flow meter. A means to connect the top section 63 to the meter would be provided.

In the second embodiment only the base and method to connect the parts to the main unit would change. All other aspects i.e. meter, suction hose, gauge, and meter of the device would remain the same.

While the embodiments of the invention have been disclosed, certain modifications may be made by those skilled in the art to modify the invention without departing from the spirit of the invention.

The inventor claims:

1. A device for accurately removing a specific volume of water from a personal aquarium comprising:
   a. a base;
   wherein said base is of a wide cylindrical shape and tapers inward and upward;
   b. a hollow cylindrical filter;
   wherein said filter is attached within the section between the base and a volume meter of the base;
   wherein said filter is of a predetermined length;
   wherein the diameter of said filter is substantially equivalent to the diameter of the top of the base;
   wherein the filter has a porosity that excludes common aquarium gravel;
   c. a suction hose;
   wherein the hose has a first and second end;
   the first end extends into the device;
   the second end extends out of the aquarium to remove the water;
   wherein the hose has a predetermined length and diameter;
   d. a plurality of flaps;
   wherein the flaps are located within a region of the volume counter at a predetermined location;
   wherein said flaps rotate with a preset friction;
   wherein the flaps spin in response to the flow of a predetermined volume of water;
   wherein the flaps are fixedly attached to rotate around an elongated pin;
   said pins extend outside of the suction tube and are stabilized on the interior walls of the device;
   e. a volumetric flow display gauge;
   wherein said gauge is fixedly attached to the exterior of the device;
   wherein said gauge is attached to said elongated pin;
   wherein said gauge displays volumetric flow in a desired system of units;
   wherein said display changes in response to the amount of the spinning motion of the rotating flaps.

2. The device described in claim 1 further comprising a reset mechanism;
   wherein said reset mechanism is fixedly attached to the exterior of the display gauge;
   wherein said reset mechanism will return the volumetric flow gauge to zero after each use.

3. The device described in claim 1 wherein the dimensions of the suction hose and settings for the volumetric flow gauge may be different for aquariums of different volumes of water.

* * * * *